United States Patent
Mincek

(10) Patent No.: US 7,575,437 B2
(45) Date of Patent: Aug. 18, 2009

(54) WIRING HARNESS WITH INTEGRATED TWO-WAY IN-LINE CONNECTION CAPABILITY

(75) Inventor: Mark F. Mincek, Auburn Hills, MI (US)

(73) Assignee: Chrysler Group LLC, Auburn Hills, MI (US)

(*) Notice: Subject to any disclaimer, the term of this patent is extended or adjusted under 35 U.S.C. 154(b) by 231 days.

(21) Appl. No.: 11/770,982

(22) Filed: Jun. 29, 2007

(65) Prior Publication Data
US 2009/0004927 A1    Jan. 1, 2009

(51) Int. Cl.
*H01R 33/00* (2006.01)
(52) U.S. Cl. .................. 439/34; 439/505; 439/498
(58) Field of Classification Search ............ 439/34, 439/498, 505
See application file for complete search history.

(56) References Cited

U.S. PATENT DOCUMENTS

| 3,675,188 A | * | 7/1972 | Startin et al. ............... 439/880 |
| 6,257,938 B1 | | 7/2001 | Day et al. |
| 6,746,250 B2 | * | 6/2004 | Blutbacher ................... 439/34 |
| 2002/0111048 A1 | * | 8/2002 | Kondoh et al. ............... 439/34 |

* cited by examiner

*Primary Examiner*—Tho D Ta
(74) *Attorney, Agent, or Firm*—Ralph E. Smith

(57) ABSTRACT

A wire harness for a motor vehicle is provided. The wire harness includes a primary node that includes a first pair of communication wires, and a optional slave node that includes a slave connector. The wire harness also includes a second pair of communication wires and a first connector that is operable to enable the optional slave node to communicate with the primary node when the slave connector is coupled to the first connector. The first connector enables communication with the primary node via the first pair of communication wires and the second pair of communication wires. One wire from the first pair and the second pair of communication wires are crimped together to form a first terminal and the remaining wires of the first pair and the second pair of communication wires are crimped together to form a second terminal for the first connector.

20 Claims, 2 Drawing Sheets

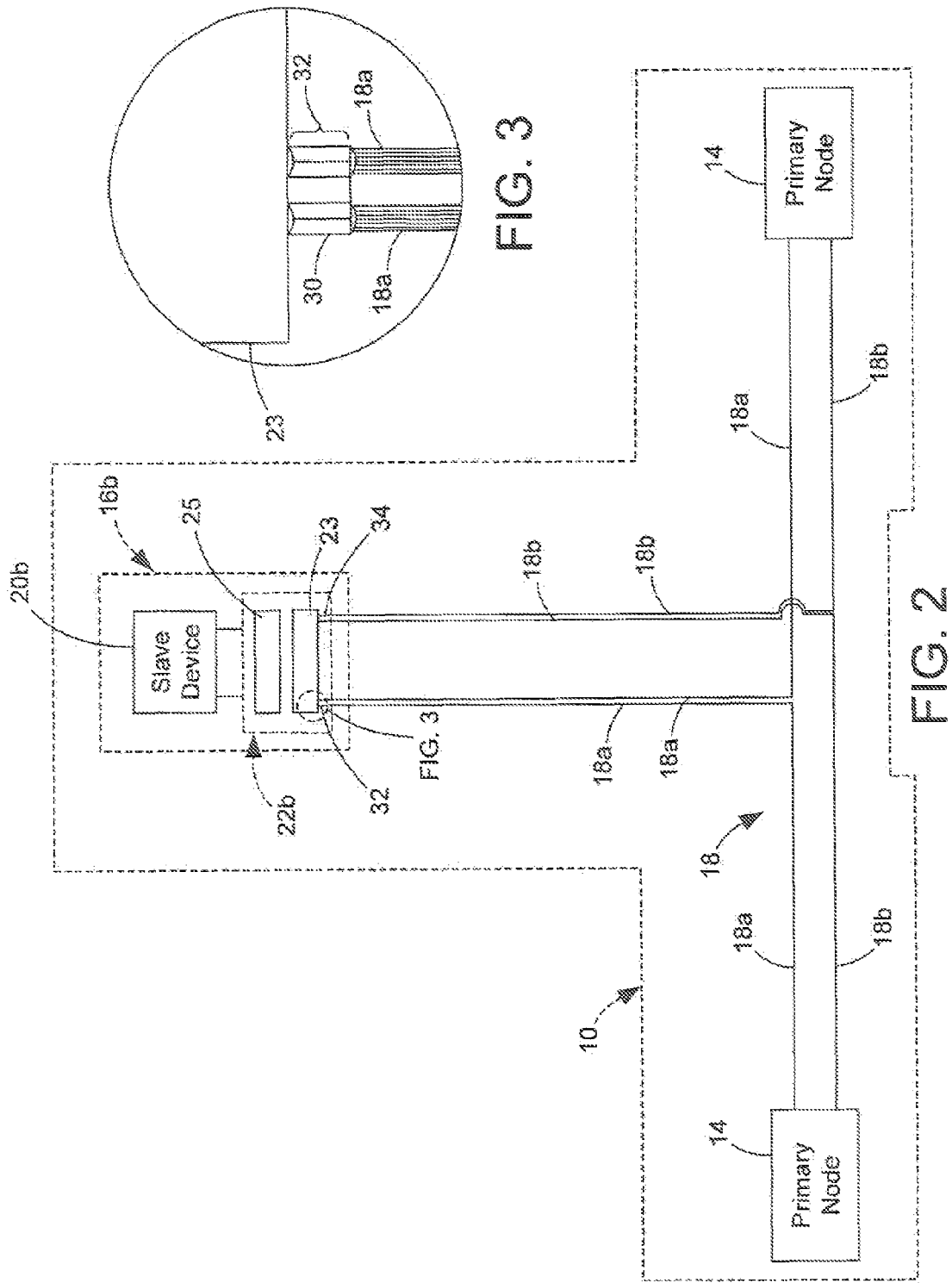

WIRING HARNESS WITH INTEGRATED TWO-WAY IN-LINE CONNECTION CAPABILITY

FIELD

The present disclosure relates to vehicle wiring systems, and more particularly to a wiring harness with integrated two-way in-line connection capability.

BACKGROUND

The statements in this section merely provide background information related to the present disclosure and may not constitute prior art.

Most motor vehicles are configured with various optional electronic equipment, such as traction control, etc. In order to efficiently wire a motor vehicle that has various configurations of optional equipment, typically, one or more wiring harnesses are employed. Wiring harnesses enable high frequency communication between a controller on the motor vehicle and the optional equipment. Typically, if all the optional equipment is included on the motor vehicle, then one wiring harness may be used. If, however, all of the optional equipment is not included on the motor vehicle, then multiple wiring harnesses are generally employed to prevent the transmission of electromagnetic interference to the controller.

SUMMARY

A wire harness for a motor vehicle is provided. The wire harness includes at least one primary node that includes a first pair of communication wires, and at least one optional slave node that includes a slave connector. The wire harness also includes a second pair of communication wires, and at least one first connector that is operable to enable the at least one optional slave node to communicate with the at least one primary node when the slave connector is coupled to the at least one first connector. The at least one first connector enables communication with the primary node via the first pair of communication wires and the second pair of communication wires. Further, one communication wire from each of the first pair of communication wires and the second pair of communication wires are crimped together to form a first terminal, and the remaining communication wires from the first pair of communication wires and the second pair of communication wires are crimped together to form a second terminal. The first terminal and the second terminal are coupled to the at least one first connector.

Further areas of applicability will become apparent from the description provided herein, it should be understood that the description and specific examples are intended for: purposes of illustration only and are not intended to limit the scope of the present disclosure.

DRAWINGS

The drawings described herein are for illustration purposes only and are not intended to limit the scope of the present disclosure in any way.

FIG. 2 is a schematic illustration of a wire harness with integrated two-way in-line connection capability; and FIG. 3 is a detail schematic view of a crimp used with the wire harness of FIGS. 1 and 2.

DETAILED DESCRIPTION

Figure 1:
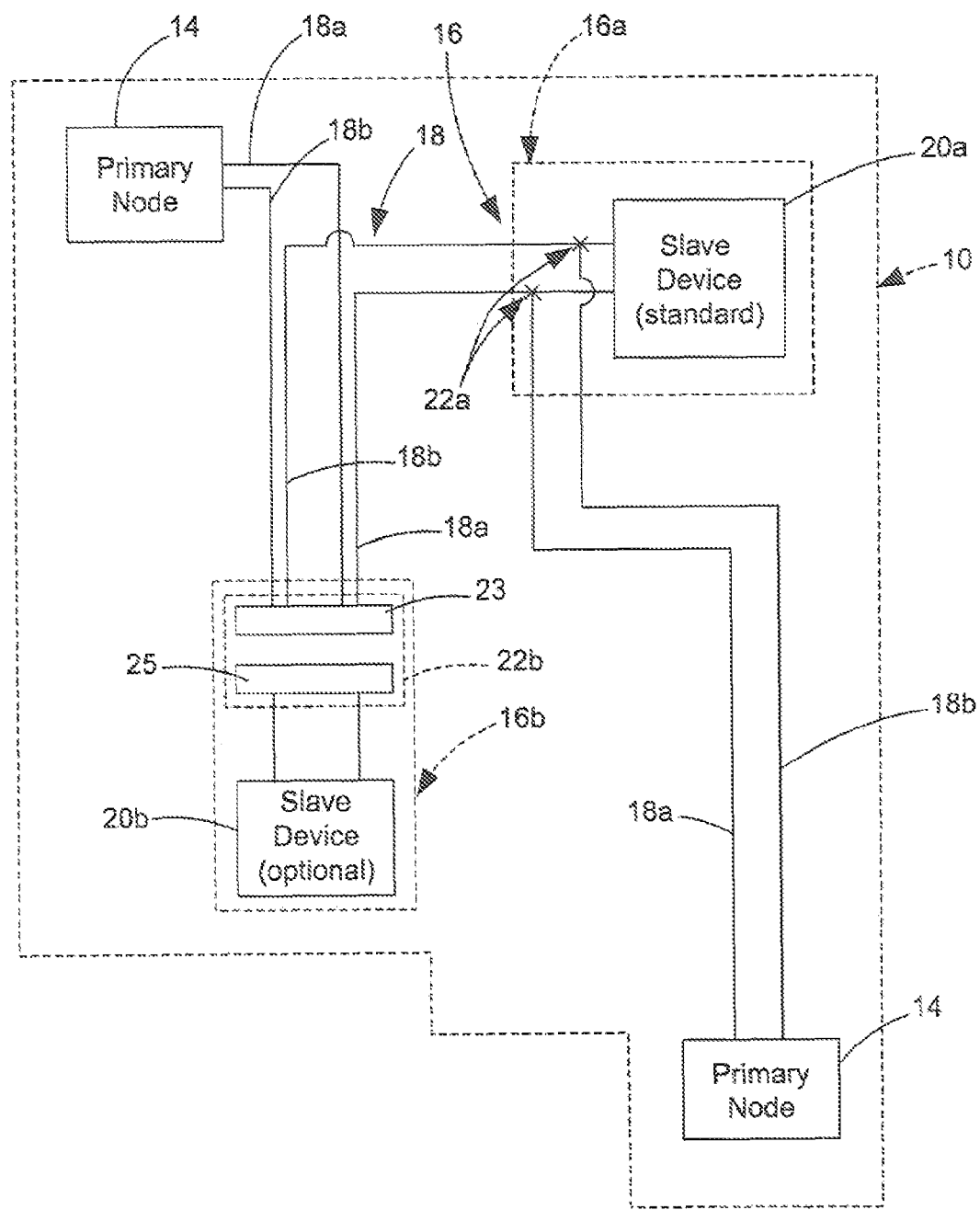
FIG. 1 is a schematic illustration of a motor vehicle employing a wire harness according to the principles of the present disclosure.

The following description is merely exemplary in nature and is not intended to limit the present disclosure, application, or uses. Although the following description is related generally to a wire harness for a motor vehicle, it will be understood that the wire harness as described and claimed herein is applicable to any type of wiring application in which it is desired to prevent unnecessary electromagnetic interference in the wiring. Therefore, it will be understood that the following discussion is not intended to limit the scope of the appended claims to only motor vehicle applications.

With reference to FIG. 1, a communications system or wiring harness 10 for use within a motor vehicle is illustrated. The wiring harness 10 includes one or more primary nodes 14 and one or more slave nodes 16 coupled together via one or more communication wires 18. For example, each of the primary nodes 14 may comprise a controller or electronic control unit, while one of the slave nodes 16 may comprise a standard slave node 16a that represents a standard feature on the motor vehicle, such as a traction control on/off actuator, and one of the slave nodes 16 may comprise an optional slave device 16b, which represents an optional feature on the motor vehicle, such as a heated seat. The communication wires 18 enable communication and data transfer between the primary nodes 14 and the slave nodes 16. The communication wires 18 may comprise any suitable databus wires, such as CAN-bus wires, however, any suitable wire or cable that enables data transfer between one or more primary nodes 14 and slave nodes 16 could be employed. The communication wires 18 include a first or a CAN-H communication wire 18a that comprises a CAN-H signal pathway and a second or a CAN-L communication wire 18b that comprises a CAN-L signal pathway.

As illustrated in FIG. 1, each primary node 14 includes the CAN-H communication wire 18a end the CAN-L communication wire 18b, which are each coupled to the slave node 16 that is adjacent to the primary node 14. As the primary node 14 may be any suitable controller or electronic control unit as known in the art, the primary node 14 will not be discussed in great detail herein. Briefly, however, the communication wires 18 from the primary nodes 14 are connected to the slave nodes 18 to enable communication between the primary nodes 14 and the slave nodes 18.

The slave nodes 16 include a slave device 20 and a connection 22. If the slave node 18 is a standard slave node 16a, then the slave device 20 may comprise a standard stave device 20a and the connection 22 may comprise a splice connection 22a. The standard slave device 20a is in communication with the primary node 14 via a pair of CAN-H communication wires 18a and a pair of CAN-L communication wires 18b. The standard slave device 20a is coupled to the primary node 14 by the splice connection 22a. The splice connection 22a comprises a conventional splice connection, and thus, the splice connection 22a will not be discussed in detail herein. If the slave node 15 is an optional slave node 16b, then the optional slave node 16b includes an optional slave device 20b, and a connection 22b. The connection 22b includes a first connector 23 and a second or slave connector 25.

The first connector 23 enables a single wiring harness 10 to be employed for various combinations of optional slave devices 20b. The slave connector 25 is coupled to the optional slave device 20b and is configured to mate with the first connector 23 to couple the optional slave device 20b to the wiring harness 10. The first connector 23 is coupled within the wiring harness 10 such that when the optional slave device 20b is coupled to the wiring harness 10 via the slave connector 25, the optional slave device 20b may communicate with the primary nodes 14. Generally, the first connector 23 of the optional slave device 20 receives at least two pairs of communication wires 18—the pair of CAN-H communication wires 18a, and the pair of CAN-L communication wires 18b that are adjacent to the first connector 23. Generally, one CAN-H communication wire 18a and one CAN-L communication wire 18b are received from the node (i.e. primary node 14 or slave node 16) that is linked directly in front of and directly behind the particular optional slave device 20b in the wiring harness 10.

For example, as shown in FIG. 2, the first connector 23 of the optional slave node 16b receives the CAN-H communication wire 18a and the CAN-L communication wire 18b from each of the primary nodes 14, as the primary nodes 14 are linked directly in front of and directly behind the optional slave node 16b. With reference to FIG. 1, the standard slave node 16a is coupled to the CAN-H communication wire 18a and the CAN-L communication wire 18b from the adjacent first connector 23 and one of the primary nodes 14 by the splice connection 22a. The first connector 23 of the optional slave node 16b is coupled between the primary node 14 and the standard slave node 16a, and thus, receives the CAN-H communication wire 18a and the CAN-L communication wire 18b from the primary node 14 and the standard slave node 16a. With the first connector 23 coupled to the wiring harness 10, communication is allowed to occur with or without the optional slave device 20b, and without undesirable electromagnetic interference if the optional slave device 20b is not connected.

in order to ensure that the communication wires 18 coupled to the first connector 23 do not cause undesirable interference or noise in the remainder of the communication wires 18 of the wiring harness 10, with reference to FIG. 3, the communication wires 18 are coupled to the first connector 23 via a crimp 30. A tool (not shown) is used to crimp the pair of CAN-H communication wires 18a into one CAN-H terminal 32 (FIG. 3) and the pair of CAN-L communication wires 18b into one CAN-L terminal 34 (FIG. 2). The crimp 30 may or may not be retained within the first connector 23, depending upon the configuration of the wire harness 10. The CAN-H terminal 32 and the CAN-L terminal 34 are coupled to the first connector 23. Thus, if the first connector 23 is not connected to the slave connector 25, communication still occurs throughout the wiring harness 10, without the unconnected communication wires 18 of the first connector 23 acting as an antenna. In this regard, since the crimp 30 is substantially small, no noise is introduced into the wiring harness 10.

Thus, in order to form the wiring harness 10 for use with various combinations of optional slave nodes 16b, a desired number of first connectors 23 are coupled to the wiring harness 10. The number of first connectors 23 corresponds to the maximum number of optional slave nodes 16b designed for the motor vehicle. In order to connect the first connectors 23 to the wiring harness 10, the primary nodes 14 are established, and the standard slave node(s) 16a may be coupled via the splice connection 22a into communication with the primary nodes 14. Then, the pair of CAN-H communication wires 18a and the pair of CAN-L communication wires 18b that lead to each of the first connectors) 23 are crimped to form the CAN-H terminal 32 and the CAN-L terminal 34 for each of the first connector(s) 23. The CAN-H terminal(s) 32 and CAN-L terminal(s) 34 are coupled to the first connector(s) 23 such that if an optional slave device 20b is coupled to the first connector 23 via the slave connector 25, then the optional slave device 20b may communicate with the primary nodes 14, but if an optional slave device 20b is not coupled to the wire harness 10, then no noise is introduced into the wire harness 10.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A wire harness for a motor vehicle comprising:
   at least one primary node that includes a first pair of communication wires;
   at least one optional slave node that includes a slave connector;
   a second pair of communication wires;
   at least one first connector that is operable to enable the at least one optional slave node to communicate with the at least one primary node when the slave connector is coupled to the at least one first connector; and
   wherein the at least one first connector enables communication with the primary node via the first pair of communication wires and the second pair of communication wires, with one communication wire from each of the first pair of communication wires and the second pair of communication wires crimped together to form a first terminal, and the remaining communication wires from the first pair of communication wires and the second pair of communication wires crimped together to form a second terminal, with the first terminal and the second terminal coupled to the at least one first connector.

2. The wire harness of claim 1, wherein the primary node is an electronic control unit.

3. The wire harness of claim 1, wherein the first pair of communication wires comprise CAN-bus wires, which include a first CAN-H signal pathway and a first CAN-L signal pathway.

4. The wire harness of claim 3, wherein the second pair of communication wires comprise CAN-bus wires that includes a second CAN-H signal pathway and a second CAN-L signal pathway.

5. The wire harness of claim 4, wherein the CAN-H wires from the first pair of communication wires and the second pair of communication wires are crimped together to form the first terminal.

6. The wire harness of claim 5, wherein the CAN-L wires from the first pair of communication wires and the second pair of communication wires are crimped together to form the second terminal, 7. The wire harness of claim 6, wherein the crimp on the CAN-L wires and the CAN-H wires enables communication through the wire harness when the at least one optional slave node is not connected to the first connector.

8. The wire harness of claim 6, further comprising:
at least one standard slave device that includes at least one third pair of CAN-bus wires, the third pair of CAN-bus wires including a third CAN-H signal pathway and a third CAN-L signal pathway, the third pair of CAN-bus wires coupled via a splice to the first pair of CAN-bus wires or the second pair of CAN-bus wires.

9. The wire harness of claim 4, further comprising:
a second primary node that includes the second pair of CAN-bus wires.

10. A wire harness for a motor vehicle comprising:
a first pair of CAN-bus wires, the first pair of CAN-bus wires including a first CAN-H signal pathway and a first CAN-L signal pathway;
a second pair of CAN-bus wires that includes a second CAN-H signal pathway and a second CAN-L signal pathway;
a connector that receives the first pair of CAN-bus wires and the second pair of CAN-bus wires, the first pair of CAN-bus wires and the second pair of CAN-bus wires coupled to the connector; and
wherein the first CAN-H signal pathway and the second CAN-H signal pathway are crimped together to form a CAN-H terminal and the first CAN-L signal pathway and the second CAN-L signal pathway are crimped together to form a CAN-L terminal, with the CAN-H terminal and the CAN-L terminal coupled to the connector to enable communication between the first pair of CAN-bus wires and the second pair of CAN-bus wires.

11. The wire harness of claim 10, further comprising:
a first primary node that includes the first pair of CAN-bus wires.

12. The wire harness of claim 10, wherein the crimp on the CAN-L wires and the CAN-H wires enables communication through the wire harness when the at least one optional slave node is not connected to the first connector.

13. The wire harness of claim 10, further comprising;
at least one standard slave device that includes at least one third pair of CAN-bus wires, the third pair of CAN-bus wires including a third CAN-H signal pathway and a third CAN-L signal pathway, the third pair of CAN-bus wires coupled via a splice to the first pair of CAN-bus wires or the second pair of CAN-bus wires.

14. The wire harness of claim 10, further comprising:
a second primary node that includes the second pair of CAN-bus wires.

15. A method of forming a wire harness for a motor vehicle comprising:
connecting a first pair of CAN-bus wires from a first primary node to a first connector, the first pair of CAN-bus wires including a CAN-H signal pathway and a CAN-L signal pathway;
connecting a second pair of CAN-bus wires to the first connector, the second pair of CAN-bus wires including a CAN-H signal pathway and a CAN-L signal pathway;
wherein connecting the first pair and the second pair of CAN-bus wires includes crimping both of the CAN-H signal pathway CAN-bus wires together and crimping both of the CAN-L signal pathway CAN-bus wires together.

16. The method of claim 15, further comprising;
coupling at least one slave device to the first connector by a slave connector.

17. The method of claim 16, wherein crimping the CAN-L wires and the CAN-H wires enable communication through the wire harness when the at least one slave device is not connected to the first connector.

18. The method of claim 15, further comprising:
connecting at least one standard slave device that includes at least one third pair of CAN-bus wires to the first pair of CAN-bus wires or the second pair of CAN-bus wires by splicing the third pair of CAN-bus wires info communication with the first pair of CAN-bus wires or the second pair of CAN-bus wires.

19. The method of claim 18, wherein the at least one third pair of CAN-bus wires includes a third CAN-H signal pathway and a third CAN-L signal pathway, and the splicing further comprises:
splicing the third CAN-H signal pathway into communication with the first CAN-H signal pathway of the first pair of CAN-bus wires or the second CAN-H signal pathway of the second pair of CAN-bus wires; and
splicing the third CAN-L signal pathway into communication with the first CAN-L signal pathway of the first pair of CAN-bus wires or the second CAN-L signal pathway of the second pair of CAN-bus wires.

20. The method of claim 15, further comprising:
connecting a first primary node to the wire harness by the first pair of CAN-bus wires; and
connecting a second primary node to the wire harness by the second pair of CAN-bus wires.

* * * * *